(12) United States Patent
Wallin et al.

(10) Patent No.: US 11,584,306 B1
(45) Date of Patent: Feb. 21, 2023

(54) EQUIPMENT RACK FOR A VEHICLE

(71) Applicant: Rise Outside, LLC, Layton, UT (US)

(72) Inventors: Craig Wallin, Hyrum, UT (US); Trevin Wallin, Mountain Green, UT (US); Brandon Wallin, Providence, UT (US)

(73) Assignee: Rise Outside, LLC, Layton, UT (US)

( * ) Notice: Subject to any disclaimer, the term of this patent is extended or adjusted under 35 U.S.C. 154(b) by 0 days.

(21) Appl. No.: 17/498,982

(22) Filed: Oct. 12, 2021

(51) Int. Cl.
*B60R 9/10* (2006.01)
*B62H 3/12* (2006.01)
*B60R 9/06* (2006.01)

(52) U.S. Cl.
CPC .............. *B60R 9/10* (2013.01); *B62H 3/12* (2013.01); *B60R 9/06* (2013.01)

(58) Field of Classification Search
CPC .......... B60R 9/06; B60R 9/10; Y10S 224/924
See application file for complete search history.

(56) References Cited

U.S. PATENT DOCUMENTS

| | | | |
|---|---|---|---|
| 4,695,218 A | | 9/1987 | Boyer |
| 5,529,231 A | * | 6/1996 | Burgess ................... B60R 9/10 248/592 |
| 5,662,256 A | | 9/1997 | Bryan |
| 5,685,469 A | * | 11/1997 | Stapleton ................. B60R 9/10 224/536 |
| 5,709,521 A | | 1/1998 | Glass et al. |
| 5,752,637 A | | 5/1998 | Blankenburg |
| 6,401,999 B1 | | 6/2002 | Hehr |
| 6,485,243 B1 | | 11/2002 | Ferman |
| 7,097,408 B2 | * | 8/2006 | Paxton ...................... B60P 3/10 224/504 |
| 9,504,322 B1 | | 11/2016 | McJunkin |
| 10,040,402 B1 | | 8/2018 | Brusselback |
| 10,399,506 B2 | * | 9/2019 | Anderson ................. B60R 9/10 |
| 10,946,782 B2 | | 3/2021 | Thompson |
| 2008/0085176 A1 | | 4/2008 | Stakus |
| 2011/0057008 A1 | * | 3/2011 | Clausen .................... B60R 9/10 224/504 |
| 2014/0299642 A1 | | 10/2014 | Schatz et al. |
| 2015/0224837 A1 | * | 8/2015 | Anyan ...................... B60R 9/06 280/504 |
| 2018/0354427 A1 | * | 12/2018 | Yazdian ................... B60R 9/10 |

(Continued)

FOREIGN PATENT DOCUMENTS

| EP | 3445613 B1 | | 6/2020 |
|---|---|---|---|
| SE | 441586 B | * | 10/1985 |

OTHER PUBLICATIONS

N/A, Mike's Bikes, Online Product Listing, Aug. 9, 2021, https://mikesbikes.com/products/saris-door-county-electric-lift-2-bike-2-hitch?variant=393687602627258gclid=EAlalQobChMln96hi-6k8gIVEJflCh1kTg35EAQYASABEgLBP_D_BwE.

*Primary Examiner* — Corey N Skurdal
(74) *Attorney, Agent, or Firm* — Preston P. Frischknecht; Project CIP (57) ABSTRACT

Embodiments of the present invention include an equipment rack for a vehicle, such as a vertical, tire-mount bicycle rack, that is specially adapted for heavier bicycles like e-bicycles, that is significantly more robust than prior vertical bicycle racks by using a high-powered actuator coupled with a base structure that optimizes both leverage and stability through a wide, cradling hinge plate and post member pivot axis that is located aft of the post member when the post member is in a generally vertical position.

22 Claims, 7 Drawing Sheets

(56) References Cited

U.S. PATENT DOCUMENTS

2019/0161022 A1* 5/2019 McFadden ................ B60R 9/10
2020/0406830 A1 12/2020 Owen et al.
2021/0147023 A1 5/2021 Harrill et al.

* cited by examiner

EQUIPMENT RACK FOR A VEHICLE

BACKGROUND

Vertical mount equipment racks for vehicles allow users to carry more by positioning equipment vertically with respect to the vehicle. Vertical bike trailer hitch racks are one type of such vertical mount equipment racks. These racks allow users with a trailer hitch the ability to mount up to six bikes, usually by pivoting backwards for loading, then positioned and/or locked vertically for travel. These designs are relatively new, achieving popularity and widespread adoption only within the last few years. Significantly, the vast majority of these designs are for mounting and carrying conventional mountain and/or road bicycles. Accordingly, the corresponding structures, functionalities, and weight capacities are all premised upon loads of up to 300 pounds.

Electronic bikes ("e-bikes") are increasingly popular, with major markets experiencing; annual growth of between 10-50% or more, and there are millions of new users each year. E-bike users also want to be able to easily transport their bikes with other vehicles. However, e-bikes present unique challenges to existing rack designs. For example, e-bikes may weigh between 40 and 70 pounds 50% heavier than a conventional mountain bike. At best, the existing structures, functionalities, and weight capacities of vertical bike trailer hitch racks are inadequate to address these unique challenges. At worst, attempting to use existing bicycle designs with e-bikes may pose significant safety hazards through overloading failure, including traffic accidents as such events occur during transport.

What is needed is a vertical mount equipment rack—such as a vertical bike trailer hitch rack—that is specifically designed for the unique challenges presented by loading, carrying, and unloading e-bikes, and that optimizes rack structure, functionality, and weight capacity in view of the same.

SUMMARY OF THE INVENTION

In accordance with the above, a new equipment rack for a vehicle is provided that includes a hitch member configured to mount to a vehicle trailer hitch receiver; a hinge plate member attached to the hitch member; and a post member with a first end and a second end, the first end pivotally attached to the hinge plate member, the post member configured to move between generally vertical and generally angled positions. In various embodiments, the equipment rack is significantly more robust than prior designs through a high-powered actuator coupled with a base structure that optimizes both leverage and stability through a wide, cradling hinge plate and post member pivot axis that is located aft of the post member when the post member is in a generally vertical position.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

The present invention in its various embodiments, some of which are depicted in the figures herein, is an equipment rack for a vehicle.

Figure 1:
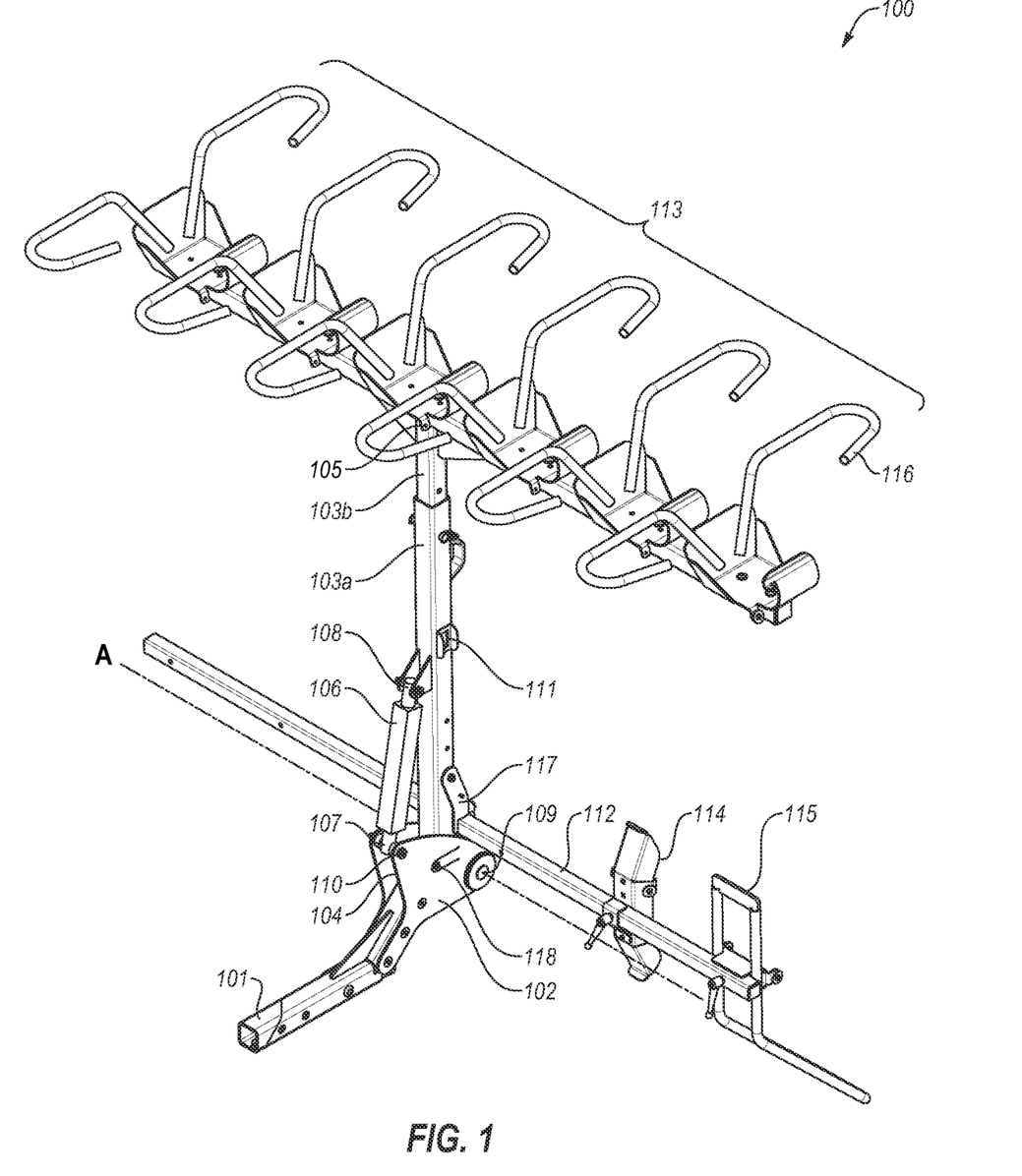
FIG. 1 is a perspective view of one embodiment of an equipment rack for a vehicle.
Figure 2:
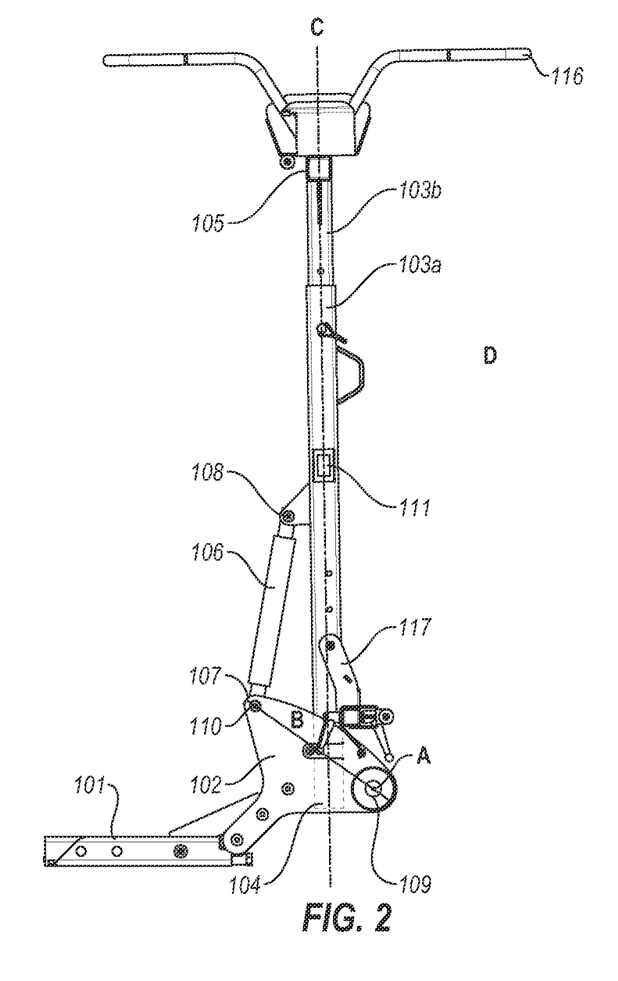
FIG. 2 is first side view of one embodiment of an equipment rack for a vehicle in a first position.
Figure 3:
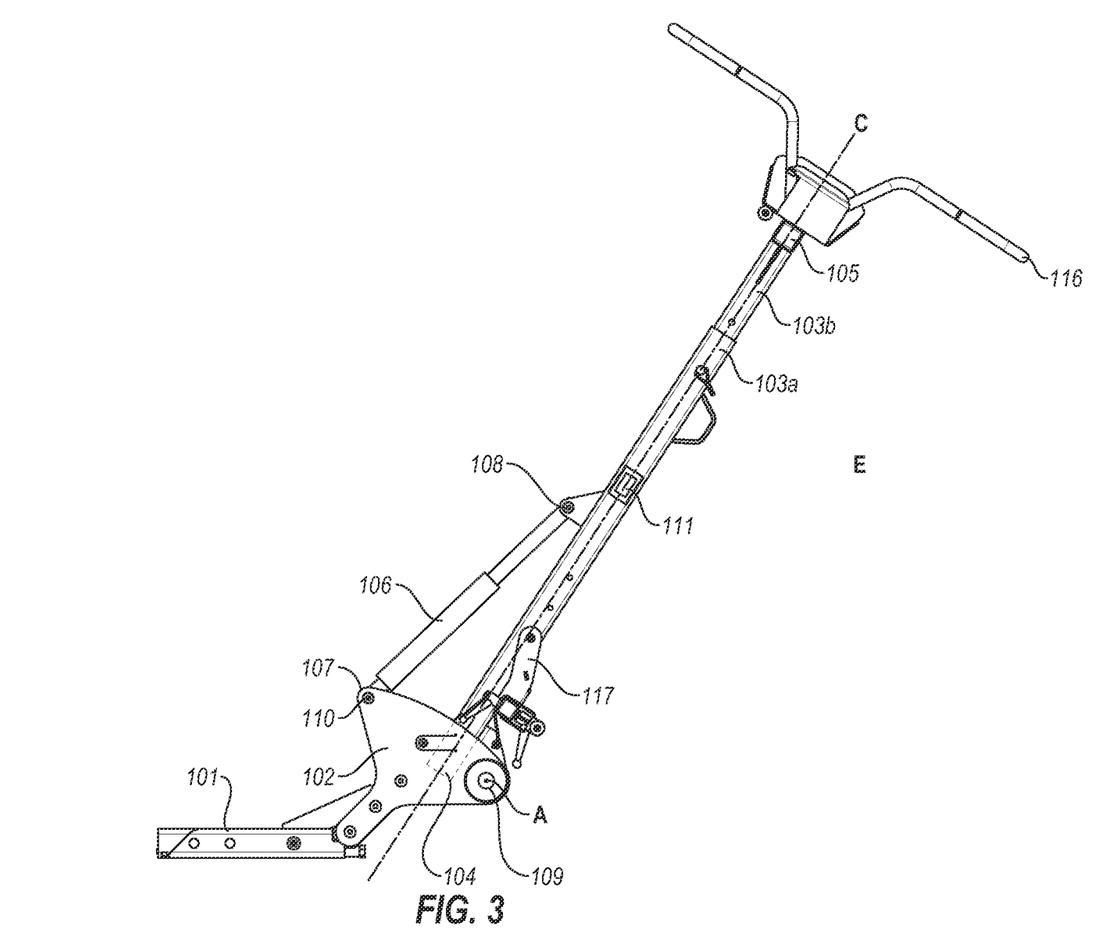
FIG. 3 is a second side view of one embodiment of an equipment rack for a vehicle in a second position.

Referring now to FIGS. 1 through 3, one embodiment of an equipment rack for a vehicle 100—here a vertical, tire-mount bicycle rack—is shown. Equipment rack 100 has a hitch member 101 configured to mount to a vehicle trailer hitch receiver. A relatively wide hinge plate member 102 is attached to the hitch member 101. Preferably, hinge plate member 102 has a width B of between 6 and 14 inches. The illustrated embodiment represents an angled hitch member-hinge plate configuration adapted for low mount vehicles such as cars, vans, and jeeps. For example, in such embodiments, hitch plate member 102 may be angled and/or positioned above hitch member 101. Other embodiments for high mount vehicles such as trucks may incorporate a straighter hitch member-hinge plate configuration. For example, in these embodiments, hitch plate member 102 may be more lateral to hitch member 101.

Rack 100 also has a post member 103 with a first end 104 and a second end 105. Post member 103 may be comprised of two or more sub-post members 103a, 103b. Post member 103 and/or post member sub-parts 103a, 103b may be configured to telescopically extend. Post member first end 104 is pivotally attached to the hinge plate member 102. Post member 103 is configured to travel between generally vertical D and generally angled E positions. In the illustrated embodiment, generally angled position E is preferably between 50 and 60 degrees from horizontal.

Post member 103 is pivotable about an axis A that, in some embodiments, is located aft of the post member 103 when the post member 103 is in the generally vertical position D. Axis A does not intersect the longitudinal axis C of the post member. Hinge plate member 102 forms a cradle for the post member first end 104 that, from a side view, is at least twice as wide as the greatest width of the post member 103. In the illustrated embodiment this cradle is closer to five times the greatest width of the post member 103. The structure of the cradle comprised, in large part, of the hinge plate member 102, forms a stable base for the post member 103 by reducing the potential for forward and backward inertia. Hinge plate member 102 may include other features for regulating, restricting, or stopping travel of the post member 103 such as tab, bolt, and/or pin components 118.

Figure 4:
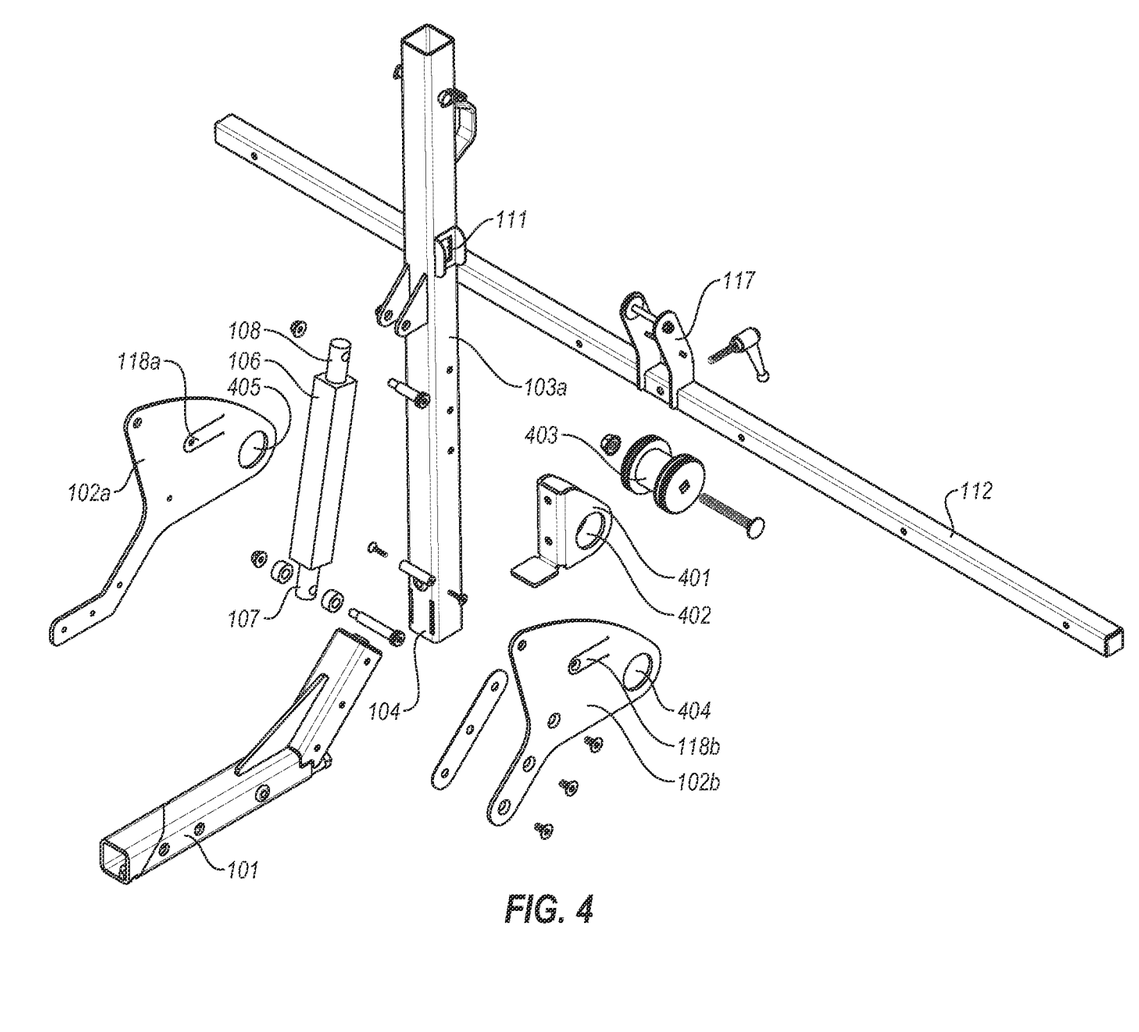
FIG. 4 is a partial, exploded view of one embodiment of an equipment rack for a vehicle.
Figure 5:
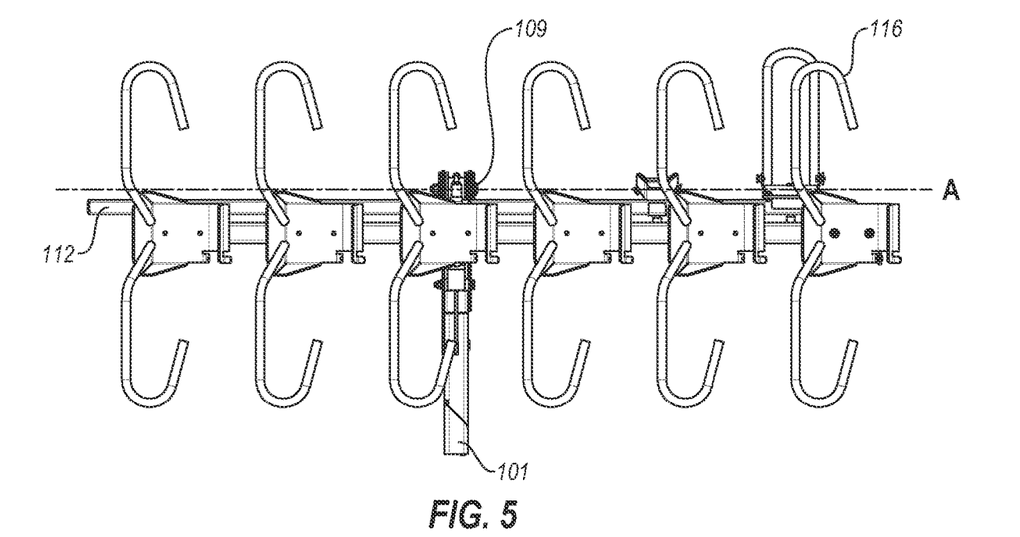
FIG. 5 is a top view of one embodiment of an equipment rack for a vehicle.
Figure 6:
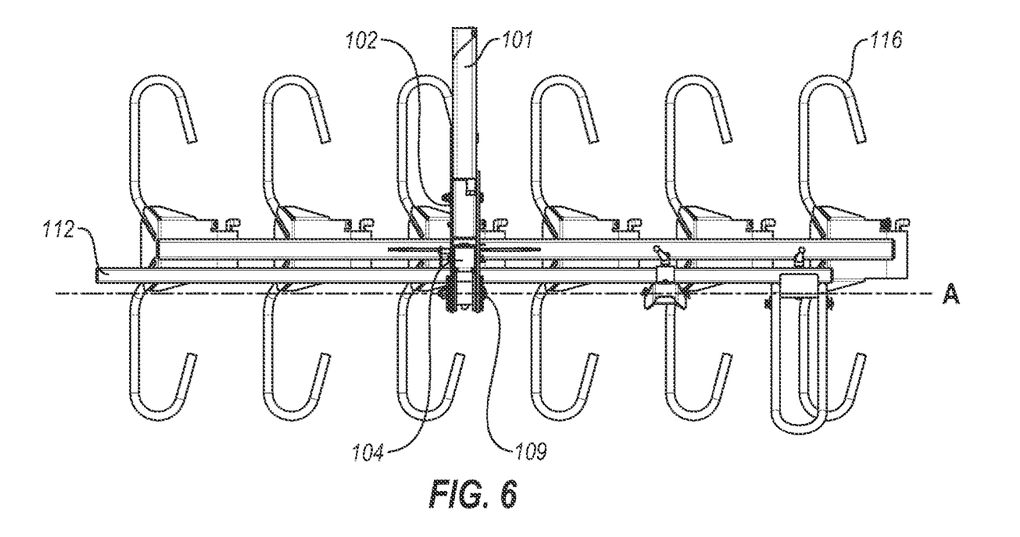
FIG. 6 is a bottom view of one embodiment of an equipment rack for a vehicle.
Figure 7:
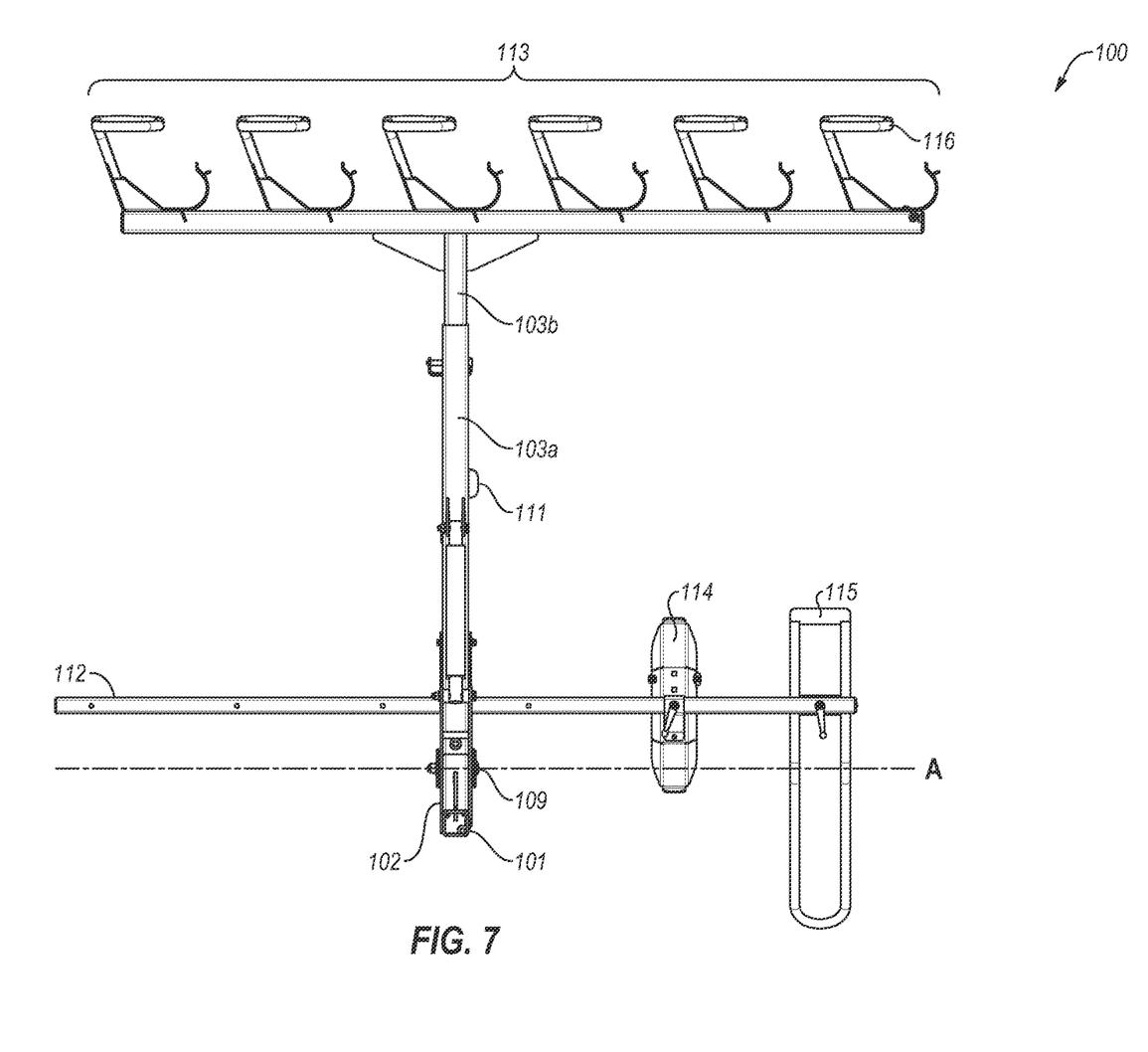
FIG. 7 is a front view of one embodiment of an equipment rack for a vehicle.
Figure 8:
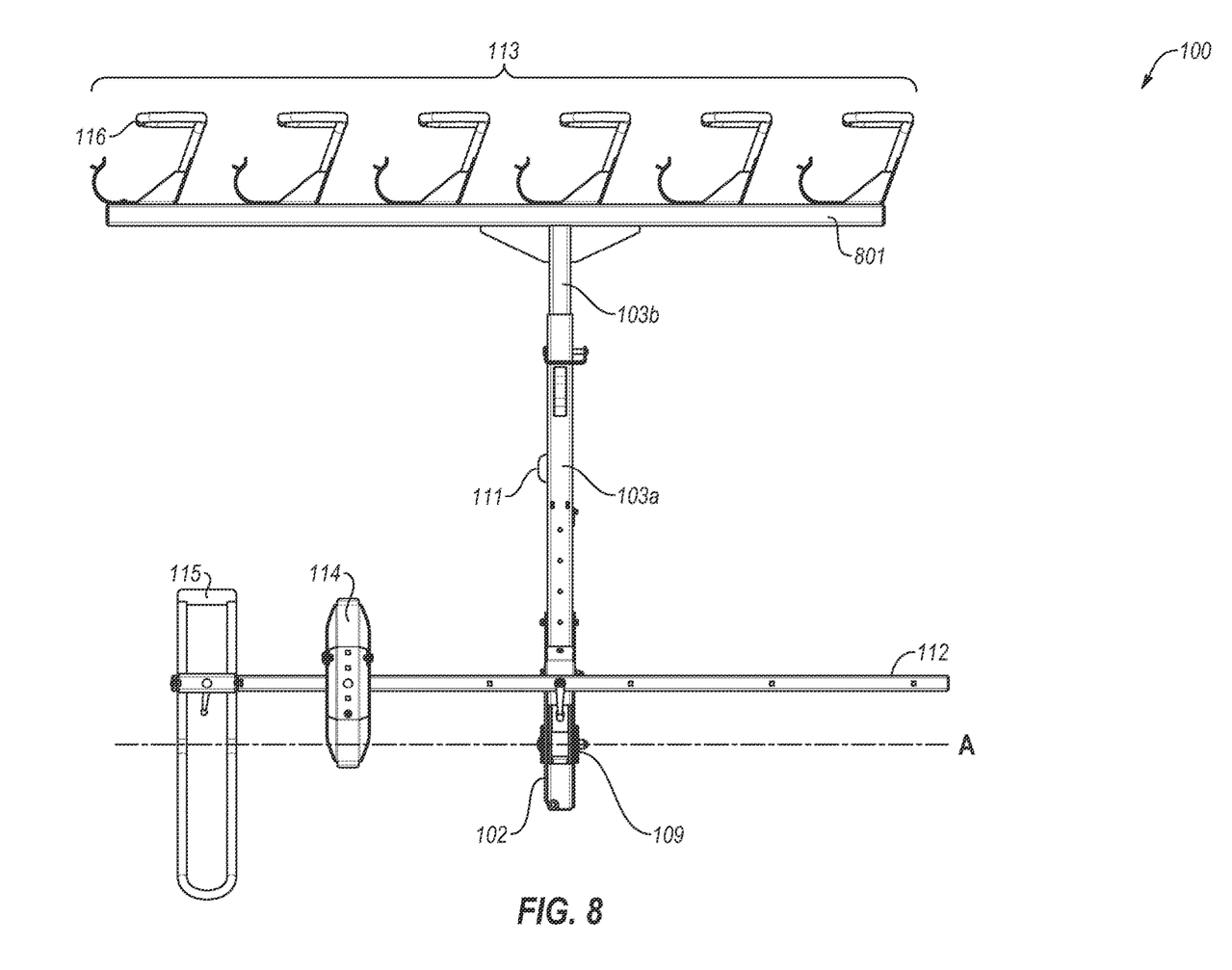
FIG. 8 is a back view of one embodiment of an equipment rack for a vehicle.

Referring briefly to FIG. 4, hinge plate member 102 may be comprised of two or more members 102a, 102b that bound post member 103. The post member pivot system may include a wide-diameter (between one and several inches) bushing assembly 403 disposed and configured to pivot within a bracket 401 attached to the post member 103 and hinge plate members 102a, 102b.

Referring back to FIGS. 1 through 3, rack 100 may also have a powered actuator 106 for moving the post member 103 between generally vertical D and generally angled E positions. Powered actuator 106 may have a first end 107 and a second end 108. The first end 107 of the powered actuator 106 is attached to the hinge plate member 102 and the second end 108 of the powered actuator 106 is attached to the post member 103 between first 104 and second 105 ends of the post member 103. In various embodiments, the post member first end 104 and powered actuator first end 107 are attached to the hinge plate member 102 at different locations 109, 110. In preferred embodiments, post member first end 104 is generally positioned between these different locations 109, 110.

In preferred embodiments, powered actuator 106 is robust, with capacity to move loads of 400, 500, and/or 600 pounds or more between generally vertical D and generally angled E positions. Powered actuator 106 may have a static load capacity of up to 4000 pounds. Powered actuator 106 may be configured to connect to vehicle trailer, electrical, or other powering or controlling connections. Rack 100 may include a momentary and/or other switch 111 to facilitate movement between positions.

Rack 100 further has bottom 112 and top 113 generally horizontal mounting members. Bottom 112 and top 113 generally horizontal mounting members may further include a plurality of tire baskets 114, 115, 116 for mounting equipment on the rack 100.

So, configured, the invention includes a vertical mount equipment rack—such as a vertical bike trailer hitch rack—that is specifically designed for the unique challenges presented by loading, carrying, and unloading e-bikes. The rack optimizes rack structure, functionality, and weight capacity by incorporating, in part, a high-powered actuator coupled with a base structure that optimizes both leverage and stability through a wide, cradling hinge plate and post member pivot axis that is located aft of the post member when the post member is in a generally vertical position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A rack for a vehicle comprising:
    a hitch member configured to mount to a vehicle trailer hitch receiver;
    a hinge plate member attached to the hitch member, the hinge plate member having a first end and a second end generally opposite the first end; and
    a post member with a first end and a second end, the first end pivotally attached to the hinge plate member, the post member configured to move between generally vertical and generally angled positions and pivotable about an axis located aft of the post member when the post member is in the generally vertical position,
    wherein the first end of the hinge plate member is substantially aft of the post member when the post member is in the generally vertical position and the second end of the hinge plate member is substantially forward of the post member when the post member is in the generally vertical position.

2. The rack for a vehicle of claim 1, the post member pivotable generally at its first end about an axis that does not intersect a longitudinal axis of the post member.

3. The rack for a vehicle of claim 1, the hinge plate member having a width of between about 6 and 14 inches.

4. The rack for a vehicle of claim 1, wherein the hinge plate member forms a cradle for the post member first end that is at least three times as wide as the greatest width of the post member.

5. The rack for a vehicle of claim 1, wherein the post member is configured to telescopically extend.

6. The rack for a vehicle of claim 1, wherein the rack is a vertical, tire-mount bike rack.

7. The rack for a vehicle of claim 1, further having a total weight capacity of at least 400 pounds.

8. A rack for a vehicle comprising:
    a hitch member configured to mount to a vehicle trailer hitch receiver;
    a hinge plate member attached to the hitch member;
    a post member with a first end and a second end, the first end pivotally attached to the hinge plate member; and
    a powered actuator for moving the post member between generally vertical and generally angled positions, the powered actuator having a first end and a second end, the first end of the powered actuator attached to the hinge plate member and the second end of the powered actuator attached to the post member between first and second ends of the post member, the powered actuator located generally between the hitch member and the post member.

9. The rack for a vehicle of claim 8, the post member pivotable generally at its first end about an axis that does not intersect a longitudinal axis of the post member.

10. The rack for a vehicle of claim 8, the post member pivotable about an axis located aft of the post member when the post member is in the generally vertical position.

11. The rack for a vehicle of claim 8, the post member first end pivotally attached to the hinge plate member at a first hinge plate member location and the powered actuator first end attached to the hinge plate member at a second hinge plate member location.

12. The rack for a vehicle of claim 11, the post member first end generally located between the first and second hinge plate member locations.

13. The rack for a vehicle of claim 11, the distance between first and second hinge plate member locations between about 6 and 14 inches.

14. The rack for a vehicle of claim 8, the hinge plate member having a width of between about 6 and 14 inches.

15. The rack for a vehicle of claim 8, wherein the hinge plate member forms a cradle for the post member first end that is at least twice as wide as the greatest width of the post member.

16. The rack for a vehicle of claim 8, wherein the post member is configured to telescopically extend.

17. The rack for a vehicle of claim 8, further comprising a momentary switch for moving the post member between generally vertical and generally angled positions.

18. The rack for a vehicle of claim 8, the powered actuator configured to connect to vehicle trailer connections.

19. The rack for vehicle of claim 8, wherein the rack is a vertical, tire-mount bike rack.

20. The rack for vehicle of claim 8, the powered actuator further configured to move the post member between generally vertical and generally angled positions when the post member is loaded with at least 400 pounds of weight.

21. A vertical, tire-mount bike rack for a vehicle comprising:
- a hitch member configured to mount to a vehicle trailer hitch receiver;
- a hinge plate member attached to the hitch member;
- a post member with a first end and a second end, the first end pivotally attached to the hinge plate member at a first hinge plate member location, the post member pivotable at its first end about an axis that does not intersect a longitudinal axis of the post member;
- a powered actuator for moving the post member between generally vertical and generally angled positions, the powered actuator having a first end and a second end, the first end of the powered actuator attached to the hinge plate member at a second hinge plate member location and the second end of the powered actuator attached to the post member between first and second ends of the post member;
- wherein the distance between first and second hinge plate member locations is between 6 and 14 inches.

22. The rack for a vehicle of claim 21, wherein the hinge plate member forms a cradle for the post member first end that is at least twice as wide as the greatest width of the post member.

* * * * *